United States Patent [19]

Hamada et al.

[11] Patent Number: 5,082,285
[45] Date of Patent: Jan. 21, 1992

[54] SOLID GOLF BALL

[75] Inventors: Akihiko Hamada, Kakogawa; Hidenori Hiraoka, Kobe, both of Japan

[73] Assignee: Sumitomo Rubber Industries, Ltd., Hyogo, Japan

[21] Appl. No.: 605,413

[22] Filed: Oct. 30, 1990

[30] Foreign Application Priority Data

Nov. 7, 1989 [JP] Japan .................. 1-289615

[51] Int. Cl.$^5$ .................. A63B 37/00; C08F 8/00
[52] U.S. Cl. .................. 273/218; 273/220; 273/230; 524/908; 525/193
[58] Field of Search .................. 273/218, 220, 230; 524/908; 525/193

[56] References Cited

U.S. PATENT DOCUMENTS 4,683,257 7/1987 Kakiuchi et al. .................. 273/218
4,770,422 9/1988 Isaac .................. 273/218

Primary Examiner—John C. Bleutge
Assistant Examiner—Thomas Hamilton, III
Attorney, Agent, or Firm—Birch, Stewart, Kolasch & Birch

[57] ABSTRACT

The present invention provides a solid golf ball containing the ultra-high molecular weight polybutadiene which is formulated therein in a solution form. The golf ball has very improved impact resilience and durability. The present invention provides a solid golf ball having at least a resilient portion therein formed from a rubber composition which comprises a base rubber, a crosslinking agent and a co-crosslinking agent, wherein said base rubber comprises a solid polybutadiene prepared by mixing the following components in solution form (a) 5 to 50% by weight of an ultra-high molecular weight polybutadiene rubber which has a cis-1,4-bond of at least 80% and a number average molecular weight of $40 \times 10^4$ or more, and (b) 95 to 50% by weight of a polybutadiene rubber which has a cis-1,4-bond of at least 80% and a number average molecular weight of less than $40 \times 10^4$.

8 Claims, No Drawings

SOLID GOLF BALL

FIELD OF THE INVENTION

The present invention relates to a novel solid golf ball.

BACKGROUND OF THE INVENTION

Solid golf balls are golf balls other than wound golf balls which contain a center wound with elastic rubber thread, including one-piece solid golf balls which are produced by integrally molding, and two-piece solid golf balls which are composed of a solid core and a cover covering the solid core. The solid core of the two-piece solid golf balls may be composed of two or more layers, which are often called multi-piece solid golf ball. Any solid golf balls integrally or partially have resilient portions which are prepared by vulcanizing and molding a rubber composition.

In order to improve impact resilience of the resilient portion, many investigations have been made on ingredients to be formulated into a rubber composition, vulcanizing conditions and the like.

Japanese Kokai (unexamined) Publications 275356/1988 and 89750/1987 suggest to employ a polybutadiene which has a higher Mooney viscosity than a polybutadiene conventionally used for golf balls. Since the suggested polybutadiene contains high molecular weight fractions in a large quantity, the impact resilience and durability of the solid golf balls are improved.

Although it is considered to employ a untra-high molecular weight polybutadiene which has very high molecular weight far from the convention polybutadiene, it has some disadvantages in processability. Thus, the ultra-high molecular weight polybutadiene is very difficult to mix with other ingredient.

SUMMARY OF THE INVENTION

The present invention provides a solid golf ball containing the ultra-high molecular weight polybutadiene which is formulated therein in a solution form. The golf ball has very improved impact resilience and durability. Thus, the present invention provides a solid golf ball having at least a resilient portion therein formed from a rubber composition which comprises a base rubber, a crosslinking agent and a co-crosslinking agent, wherein said base rubber comprises a solid polybutadiene prepared by mixing the following components in solution form (a) 5 to 50% by weight of a ultra-high molecular weight polybutadiene rubber which has a cis-1,4-bond of at least 80% and a number average molecular weight of $40 \times 10^4$ or more, and (b) 95 to 50% by weight of a polybutadiene rubber which has a cis-1,4-bond of at least 80% and a number average molecular weight of less than $40 \times 10^4$.

DETAILED DESCRIPTION OF THE INVENTION

The untra-high molecular weight polybutadiene rubber of the present invention has a cis-1,4-bond of 80% or more, preferably 95% or more, and has a number average molecular weight of $40 \times 10^4$ or more, preferably $40 \times 10^4$ to $70 \times 10^4$. Molecular weights of less than $40 \times 10^4$ do not impart high impact resilience and durability. If a molecular weight is more than $70 \times 10^4$, the mixing dispersibility of the rubber composition becomes gradually poor.

The polybutadiene rubber to be mixed with the ultra-high molecular weight polybutadiene has a cis-1,4-bond of at least 80 or more and a number average molecular weight of less than $40 \times 10^4$, preferably $10 \times 10^4$ to $25 \times 10^4$. The polybutadiene is called herein "ordinary polybutadiene rubber". The ordinary polybutadiene rubber preferably has a Mooney viscosity ($ML_{1+4}$ 100° C.) of 40 to 70, preferably 40 to 60. The ordinary polybutadiene rubber has been used for the solid golf balls in the field.

The both polybutadienes are mixed in solution form. Mixing is generally carried out by dissolving each polybutadiene rubber in a solvent and then mixing them. Examples of the solvents are those dissolving respective polybutadiene, such as (toluene, xylene and the like). The both polybutadienes may be prepared by solution polymerization. The solution polymerized polybutadienes may be mixed intact without dissolving in the solvent. The ultra-high molecular weight polybutadiene rubber is present in the obtained mixed solid polybutadiene in an amount of 5 to 50% by weight, preferably 10 to 30. Amounts of less than 5% by weight do not impart the technical effects of the present invention and those of more than 50% by weight deteriorate processability in mixing and provide scattering of final products.

The base rubber of the present invention may contain another rubber component in addition to the polybutadiene rubber. Examples of the rubber components are EPDM, styrene-butadiene rubber, polyisoprene rubber, natural rubber and the like. The other rubber component may be present in the base rubber in an amount of not more than 40% by weight.

The crosslinking agent of the present invention is generally an organic peroxide, such as dicumyl peroxide, 1,1-bis(t-butylperoxy)-3,3,5-trimethylcyclohexane, 2,5-dimethyl-2,5-di(t-butylperoxy)hexane, 2,5-dimethyl-2,5-di(t-butylperoxy)hexane-3, di-t-butyl peroxide and the like. The crosslinking agent may preferably be present in the rubber composition in an amount of 0.5 to 3.0 parts by weight, preferably 1.0 to 2.5 parts by weight, based on 100 parts by weight of the base rubber.

The co-crosslinking agent of the present invention is an unsaturated carboxylic acid and/or a metal salt thereof. Examples of the unsaturated carboxylic acids are methacrylic acid, acrylic acid and the like. The metal to be form the metal salt of the unsaturated carboxylic acids includes divalent metal, such as zinc, calcium and the like. An amount of the co-crosslinking agent is within the range of 15 to 60 parts by weight, preferably 25 to 40, based on 100 parts by weight of the base rubber.

Since the golf balls are standardized in size and weight according to JIS S-7005-1955, a filler is generally added to the rubber composition to meet the weight standard. Examples of the fillers are barium sulfate, zinc oxide, calcium carbonate, silicate hydrate and the like. The rubber composition may further contain an antioxidant, a chain transfer agent, a stabilizer and the like.

The rubber composition is generally prepared by mixing the above mentioned components, i.e. the base rubber, the crosslinking agent, a co-crosslinking agent and the like. Mixing may be carried out using a roll, a kneader, a Banbury mixer and the like. Other mixing conditions are known to the art.

The rubber composition is generally vulcanized in a mold at 140 to 170° C. for 20 to 40 minutes. In the one-piece solid golf ball, the rubber composition is vulcanized to form the golf ball. In the two-piece solid golf ball, the rubber composition is vulcanized to form a spherical solid core which is then covered with a cover resin (e.g. ionomer resin).

In the base rubber of the present invention, the untra-high molecular weight polybutadiene rubber is uniformly mixed with the ordinary polybutadiene rubber even in molecular order. Accordingly, the rubber composition prepared from the base rubber has good processability because of the properties of the ordinary polybutadiene rubber. The obtained solid golf balls have superior impact resilience and durability because of the properties of the ultra-high molecular weight polybutadiene rubber.

EXAMPLES

The present invention is illustrated by the following examples which, however, are not to be construed as limiting the present invention to their details.

EXAMPLES 1 TO 6 AND COMPARATIVE EXAMPLES 1 to 3

Table 1 shows the characteristics and manufactures of polybutadiene rubbers which were employed in the Examples.

TABLE 1

|  | A | B | C | D |
|---|---|---|---|---|
| Name | Synthesized polybutadiene (1)*[1] | Synthesized polybutadiene (2)*[2] | Ube-pole BR150L | BR-11 |
| Manufacturer | — | — | Ube Industries, Ltd. | Japan Synthetic Rubber |
| Mooney viscosity ($ML_{1+4}$, 100° C.) | Impossible to determine | Impossible to determine | 45 | 43 |
| Number average molecular weight | $55 \times 10^4$ | $45 \times 10^4$ | $21 \times 10^4$ | $10 \times 10^4$ |

*[1] A reaction vessel was charged with 650 ml of dehydrated toluene and 350 ml of 1,3-butadiene, to which 40 microliter of water was added and mixed for one hour. To the content, 2.2 mmol of 1,3-butadiene was added and then 2.9 mmol of diethylaluminum chloride and 0.009 mmol of cobalt octate were added and polymerized at 40° C. for one hour. To the content, 5 ml of methanol was added to terminate the polymerization.

After the completion of the polymerization, 235 ml of 2% toluene solution of 2,6-di-t-butyl-4-methylphenol was added and mixed. Thereafter, unreacted 1,3-butadiene was removed, to which methanol was added to precipitate an obtained polymer. The obtained polymer was dried for 3 days at room temperature and vacuum-dried.

The dried polymer had a number average molecular weight of $55.2 \times 10^4$ which was determined by HLC 802 type GPC available from Tohso Co., Ltd. by using standard polystyrene.

*[2] A reaction vessel was charged with a mixture of 100 ml of toluene and 0.187 mg atom nickel of nickel naphthenate to which a mixture solution of 100 ml of toluene and 2.55 mmol of trifluoride borate etherate was added and reacted at 20° C. for 20° C. Then, a mixture of 100 ml of toluene and 75.0 mmol of 1,3-butadiene was added, to which a mixture of 100 ml of toluene and 2.825 mmol of triethylaluminum was added.

It was mixed at 60° C. for 15 minutes, to which 600 ml of toluene and 100 g of 1,3-butadiene were added and polymerized at 40° C. for 2 hours, followed by adding 5 ml of methanol to terminate the polymerization. After the completion of the polymerization, 120 ml of 2% toluene solution of 2,6-di-t-butyl-4-methylphenol was added and mixed. Thereafter, unreacted 1,3-butadiene was removed, to which methanol was added to precipitate an obtained polymer.

The obtained polymer was dried for 3 days at room temperature and vacuum-dried. The dried polymer had a number average molecular weight of $45.3 \times 10^4$ which was determined by HLC 802 type GPC available from Tohso Co., Ltd. by using standard polystyrene.

*[3] Determined according to JIS K 6,300.
*[4] Determined as mentioned in *[1] and *[2].

The ingredients shown in Table 2 were mixed using a roll and molded at 145° C. for 40 minutes under pressure to obtain a solid core having a diameter of about 38.5 mm. In case where two polybutadiene rubbers were employed, mixing was conducted as the foot note (2).

The obtained solid core was covered with a cover resin composition which contained 100 parts by weight of an ionomer resin (Himilan 1707) and 2 parts by weight of titanium oxide to obtain a large size two piece solid golf ball. The obtained golf ball was subjected to an evaluation of compression, impact resilience and durability. The results are shown in Table 2.

TABLE 2

|  |  |  | Examples | | | | | | Comparative Examples | | |
|---|---|---|---|---|---|---|---|---|---|---|---|
|  |  |  | 1 | 2 | 3 | 4 | 5 | 6 | 1 | 2 | 3 |
| Solid core ingredient | Polybutadiene | A Synthesized polybutadiene (1) | 15 | 30 | 45 |  |  |  | 30 |  |  |
|  |  | B Synthesized polybutadiene (2) |  |  |  | 15 | 30 | 45 |  |  |  |
|  |  | C BR150L | 85 | 70 | 55 |  |  |  | 70 | 100 |  |
|  |  | D BR-11 |  |  |  | 85 | 70 | 55 |  |  | 100 |
|  | Zinc acrylic |  | 31 | 31 | 31 | 31 | 31 | 31 | 31 | 31 | 31 |
|  | Zinc oxide |  | 22 | 22 | 22 | 22 | 22 | 22 | 22 | 22 | 22 |
|  | Dicmyl peroxide |  | 2.0 | 2.0 | 2.0 | 2.0 | 2.0 | 2.0 | 2.0 | 2.0 | 2.0 |
|  | Antioxidant[1] |  | 0.5 | 0.5 | 0.5 | 0.5 | 0.5 | 0.5 | 0.5 | 0.5 | 0.5 |
| Rubber blend process[2] |  |  |  |  | Solution blend | | | | Dry blend | — | — |
| Roll mixing ability[3] |  |  | Good | Fairly good | Fairly good | Good | Good | Fairly good | Bad | Good | Good |
| Ball physical | Comparision[4] |  | 103 | 103 | 104 | 102 | 102 | 103 | 100 | 103 | 102 |
|  | Impact resilience[5] |  | 0.795 | 0.798 | 0.802 | 0.793 | 0.796 | 0.800 | 0.790 | 0.786 | 0.782 |

TABLE 2-continued

|  |  | Examples | | | | | | Comparative Examples | | |
| --- | --- | --- | --- | --- | --- | --- | --- | --- | --- | --- |
|  |  | 1 | 2 | 3 | 4 | 5 | 6 | 1 | 2 | 3 |
| properties | Durability[6] | 120 | 130 | 140 | 115 | 125 | 135 | 110 | 100 | 90 |

[1] Yoshinox 425 available from Yoshitomi Pharmaceutical Industries Ltd.
[2] Solution blend: Two solid rubbers were respectively dissolved in toluene to form two rubber solutions. The both solutions were mixed and then methanol was added to precipitate the mixed rubber which was dried to obtain a dried mixed rubber. Dry blend: Two solid rubber were mixed using a conventional mixer, such as a roll, a kneader or a Banbury mixer.
[3] Roll mixing ability: Evaluations were made on roll winding condition, dispersibility of the ingredients and surface condition of the obtained sheet blank. Good: Every evaluation point is good.
Fairly good: Dispersibility of the ingredients is good, but other points are not so good.
Bad: Every evaluation point is bad.
[4] Compression according to PGA.
[5] Impact resilience: A metal cylinder of 198.4 was collided with a golf ball at a speed of 45 to hit the ball. It was calculated from its initial velocity at 23° C.
[6] Durability: A golf ball was repeatedly hit to a panel at a speed of 45 m/s until the ball was crashed. The number of collisions when the ball was crashed was expressed in an index as the number of Comparative Examples 2 and 5 being 100.

EXAMPLES 7 TO 12 AND COMPARATIVE EXAMPLES 4 TO 6

The ingredients shown in Table 3 were mixed using a roll and molded at 170° C. for 25 minutes under pressure to obtain a large size one-piece solid golf ball. In case where two polybutadiene rubbers were employed, mixing was conducted as the foot note (2).

The obtained golf ball was subjected to an evaluation of compression, impact resilience and durability. The results are shown in Table 3.

TABLE 3

|  |  |  | Examples | | | | | | Comparative Examples | | |
| --- | --- | --- | --- | --- | --- | --- | --- | --- | --- | --- | --- |
|  |  |  | 7 | 8 | 9 | 10 | 11 | 12 | 4 | 5 | 6 |
| Solid core ingredient | Poly-butadiene | A Synthesized polybutadiene (1) | 15 | 30 | 45 |  |  |  | 30 |  |  |
|  |  | B Synthesized polybutadiene (2) |  |  |  | 15 | 30 | 45 |  |  |  |
|  |  | C BR150L | 85 | 70 | 55 |  |  |  | 70 | 100 |  |
|  |  | D BR-11 |  |  |  | 85 | 70 | 55 |  |  | 100 |
|  | Methacrylic acid |  | 25 | 25 | 25 | 25 | 25 | 25 | 25 | 25 | 25 |
|  | Zinc oxide |  | 25 | 25 | 25 | 25 | 25 | 25 | 25 | 25 | 25 |
|  | Dicmyl peroxide |  | 1.0 | 1.0 | 1.0 | 1.0 | 1.0 | 1.0 | 1.0 | 1.0 | 1.0 |
| Rubber blend process |  |  | Solution blend | | | | | | Dry blend | — | — |
| Roll mixing ability |  |  | Good | Fairly good | Fairly good | Good | Good | Fairly good | Bad | Good | Good |
| Ball physical properties | Comparision |  | 94 | 93 | 94 | 90 | 91 | 92 | 88 | 92 | 90 |
|  | Impact resilience |  | 0.715 | 0.720 | 0.725 | 0.715 | 0.720 | 0.725 | 0.710 | 0.705 | 0.705 |
|  | Durability |  | 110 | 120 | 130 | 110 | 120 | 130 | 105 | 100 | 98 |

What is claimed is:

1. A solid golf ball of high impact resilience and durability having at least a resilient portion therein formed from a rubber composition which comprises a base rubber, an organic peroxide as a crosslinking agent and an unsaturated carboxylic acid and/or a metal salt thereof as a co-crosslinking agent; said crosslinking agent being present in an amount of 0.5 to 3.0 parts by weight based on 100 parts by weight of said base rubber and said co-crosslinking agent being present in an amount of 15 to 60 parts by weight based on 100 parts by weight of said base rubber, wherein said base rubber comprises a solid polybutadiene prepared by mixing the following components in solution form:
   (a) 5 to 50% by weight of an ultra-high molecular weight polybutadiene rubber which has a cis-1,4-bond of at least 80% and a number average molecular weight of $40 \times 10^4$ or more, and
   (b) 95 to 50% by weight of a polybutadiene rubber which has a cis-1,4-bond of at least 80%, a number average molecular weight of less than $40 \times 10^4$ and a Mooney viscosity ($ML_{1+4}$ 100° C.) of 40 to 70.

2. The solid golf ball according to claim 1, wherein said ultra-high molecular weight polybutadiene rubber has a molecular weight of $40 \times 10^4$ to $70 \times 10^4$.

3. The solid golf ball according to claim 1, wherein said polybutadiene rubber to be mixed with the ultra-high molecular weight polybutadiene has a number average molecular weight of $10 \times 10^4$ to $25 \times 10^4$.

4. The solid golf ball according to claim 1, wherein said base rubber further contains another rubber selected from the group consisting of EPDM, styrene-butadiene rubber, polyisoprene rubber and natural rubber.

5. A process for preparing a solid golf ball of high impact resilience and durability comprising:
   (A) mixing in solution form (a) 5 to 50% by weight of an ultra-high molecular weight polybutadiene rubber which has a cis-1,4-bond of at least 80% and a number average molecular weight of $40 \times 10^4$ or more, and (b) 95 to 50% by weight of a polybutadiene rubber which has a cis-1,4-bond of at least 80%, a number average molecular weight of less than $40 \times 10^4$ and a Mooney viscosity ($ML_{1+4}$ 100° C.) of 40 to 70 to obtain a solid polybutadiene blend;
   (B) then mixing said solid polybutadiene blend with an organic peroxide as a crosslinking agent and an unsaturated carboxylic acid and/or a metal salt thereof as a co-crosslinking agent to obtain a rubber composition; said crosslinking agent being present in an amount of 0.5 to 3.0 parts by weight based on 100 parts by weight of said base rubber and said co-crosslinking agent being present in an amount of 15 to 60 parts by weight based on 100 parts by weight of said base rubber; and
   (C) molding said rubber composition in a mold.

6. The process of claim 5, wherein said ultra-high molecular weight polybutadiene rubber has a molecular weight of $40 \times 10^4$ to $70 \times 10^4$.

7. The process of claim 5, wherein said polybutadiene rubber to be mixed with the ultra-high molecular weight polybutadiene has a number average molecular weight of $10 \times 10^4$ to $25 \times 10^4$.

8. The process of claim 5, wherein said base rubber further contains another rubber selected from the group consisting of EPDM, styrene-butadiene rubber, polyisoprene rubber and natural rubber.

* * * * *